Figure 1:
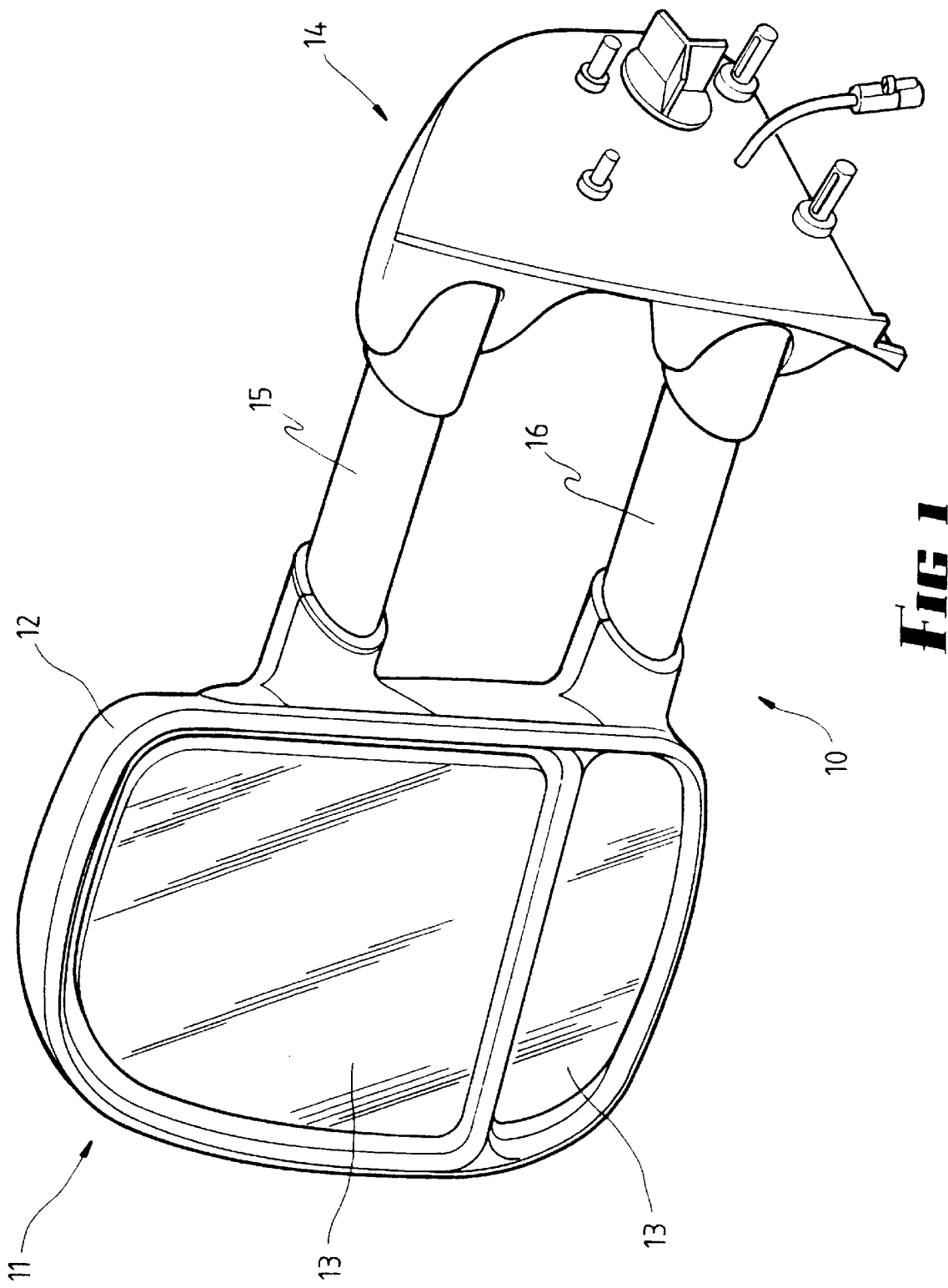

United States Patent

Rothe

[11] Patent Number: 5,841,594
[45] Date of Patent: Nov. 24, 1998

[54] PIVOT CONNECTION

[75] Inventor: Peter Rothe, Lonsdale, Australia

[73] Assignee: Britax Rainsfords PTY Ltd., Lonsdale, Australia

[21] Appl. No.: 933,554

[22] Filed: Sep. 19, 1997

[30] Foreign Application Priority Data

Sep. 27, 1996 [AU] Australia .................................. PO2628

[51] Int. Cl.⁶ .............................. G02B 5/08; G02B 7/18; F16M 13/00; A47F 7/14
[52] U.S. Cl. .......................... 359/841; 248/549; 248/900
[58] Field of Search .................................... 359/841, 871, 359/872; 248/477, 478, 479, 549, 900

[56] References Cited

U.S. PATENT DOCUMENTS

| 3,889,915 | 6/1975 | Hashiguchi et al. | 248/475.1 |
|---|---|---|---|
| 5,028,029 | 7/1991 | Beck et al. | 248/479 |
| 5,060,905 | 10/1991 | Sharp | 248/479 |
| 5,081,546 | 1/1992 | Bottrill | 359/841 |
| 5,364,058 | 11/1994 | Shepherd | 248/479 |
| 5,432,640 | 7/1995 | Gilbert et al. | 359/841 |
| 5,623,374 | 4/1997 | Montanbault | 359/841 |

FOREIGN PATENT DOCUMENTS

| 0 310 261 | 4/1989 | European Pat. Off. . |
|---|---|---|
| 25 37 876 | 8/1975 | Germany . |

Primary Examiner—Cassandra C. Spyrou
Assistant Examiner—Mark A. Robinson
Attorney, Agent, or Firm—Davis and Bujold

[57] ABSTRACT

A is a pivot connection and detent mechanism for a vehicle mirror (10) comprising:

a mounting bracket (14) that is attached to a motor vehicle having at least one pivot connection member a mirror assembly (11) including a mirror and at least one pivot connection for pivotal connection to the pivot connection member or members of the mounting bracket to allow angular movement of the mirror assembly (11) with respect to the mounting bracket (14), at least one detent recess (30) on at least one of the pivot connection members of either the mounting bracket (14) or the mirror assembly (11), a resilient arm held at its first end with respect to the pivot connection member that connects to the other pivot connection member with the detent recess (30), and a detent member (30) located at the second end of the resilient arm (40). The detent member (44) is positioned so that it engages the detent recess (30) to hold the mirror assembly (11) with respect to the mounting bracket (14). The resilient arm (40) is resiliently movable to allow the detent member (44) to disengage the detent recess (30) upon sufficient force being applied to the mirror assembly (11) to in turn allow the mirror assembly (11) to be rotated to a different position.

17 Claims, 9 Drawing Sheets

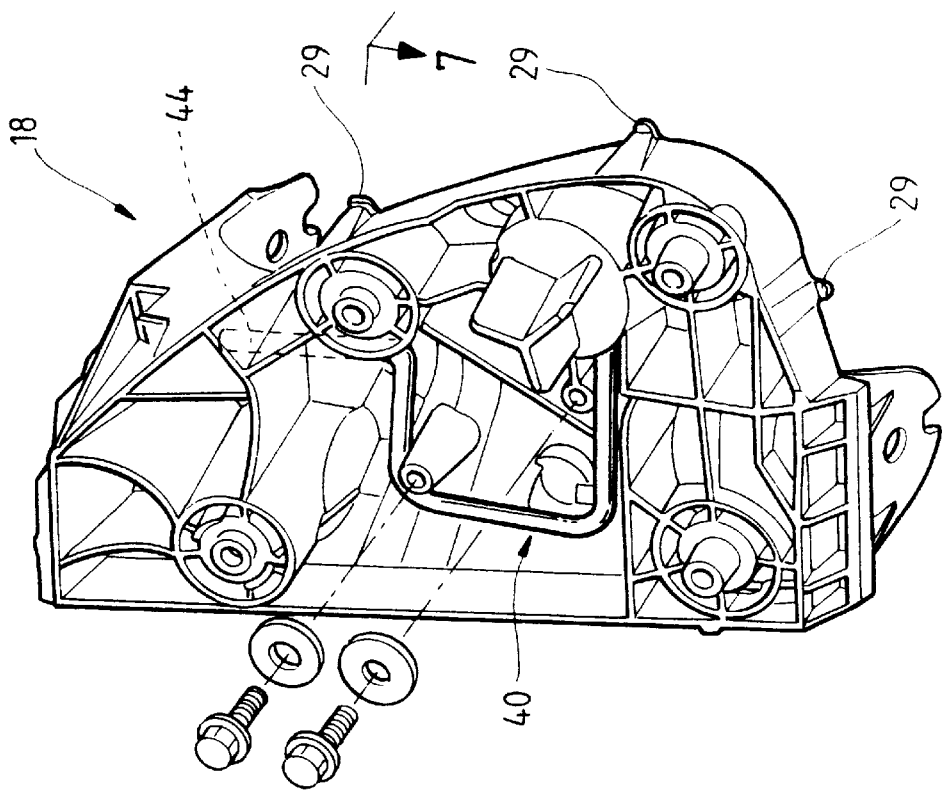
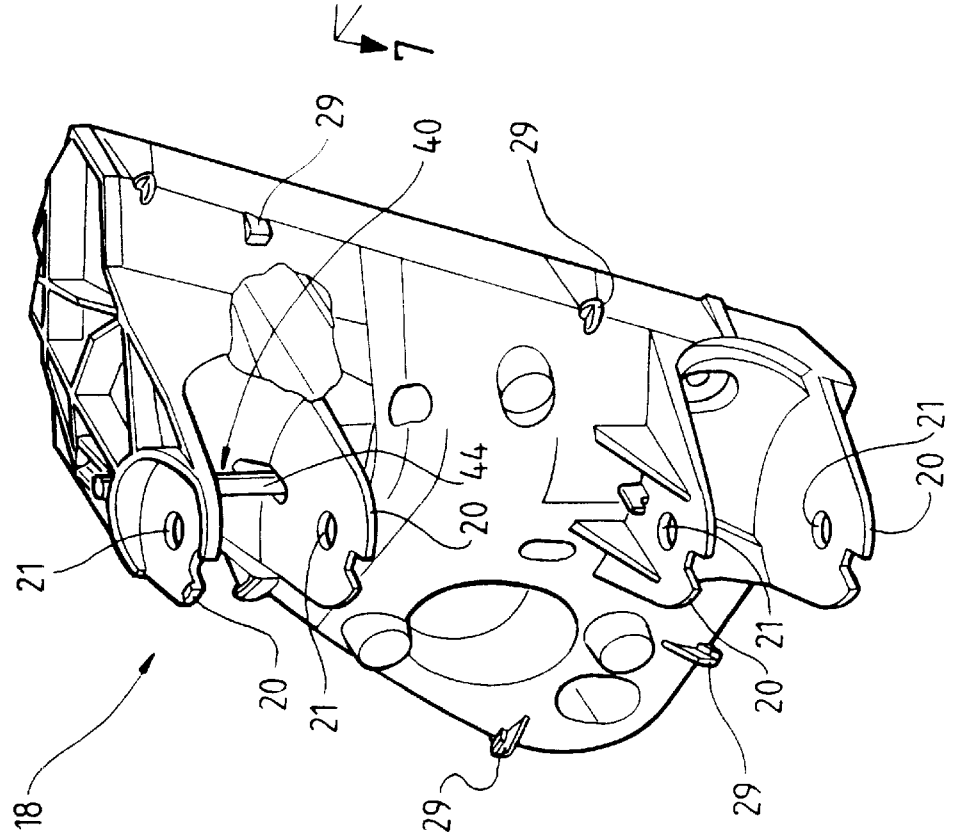

PIVOT CONNECTION

This invention relates to a pivot connection between a mounting bracket and a mirror assembly. In particular, it relates to a detent mechanism which holds the mirror assembly in a particular position, and which allows rotation of the mirror assembly via the pivot connection with respect to the mounting bracket.

The need for mirror assemblies to rotate with respect to their mounting bracket is well known. This enables the mirror to absorb any impact force, at least in one direction by breaking away from its normal use position. It also enables the mirror to be manually rotated against the side of the vehicle which is convenient when parking a vehicle.

It is an object of this invention to provide a pivot connection with an associated detent mechanism which meets the above requirements.

According to the invention is a mirror for use on a motor vehicle comprising:

a mounting bracket that is attached to a motor vehicle having at least one pivot connection member, a mirror assembly including a mirror and at least one pivot connection for pivotal connection to said pivot connection member or members of said mounting bracket to allow angular movement of said mirror assembly with respect to said mounting bracket, at least one detent recess on at least one of said pivot connection members of either said mounting bracket or said mirror assembly, a resilient arm held at its first end with respect to said pivot connection member that connects to said other pivot connection member with said detent recess, and a detent member located at the second end of said resilient arm positioned so that it engages said detent recess to hold said mirror assembly with respect to said mounting bracket, said resilient arm resiliently moveable to allow said detent member to disengage said detent recess upon sufficient force being applied to said mirror assembly to in turn allow said mirror assembly to be rotated to a different position.

The detent recess and detent member provide positive location of the mirror assembly in a fixed position and provide positive positioning of the mirror assembly when returning it to its normal position. The detent mechanism allows rotation of the mirror assembly into another position, and provides a positive location and locking once the mirror is again rotated so that the detent mechanism engages.

The resilient arm may be attached to either the mounting bracket or the mirror assembly, and provides a spring force to hold the detent member in the detent recess, thereby holding the mirror assembly with respect to the mounting bracket, and to allow movement of the detent member out of the detent recess. The relocation of the detent member in the detent recess provides a positive indication of the mirror assembly returning to its normal position. There may be more than one detent recess for re-engagement by the detent member to positively hold the mirror assembly in more than one position. The mirror assembly can then be moved to re-engage in any of the detent positions as required.

Various types of resilient arms may be used. Resilience may be provided by any appropriate means which may include a coil spring, a leaf spring or a torsion bar or spring.

In one preferred embodiment, a torsion spring is used. In this preferred arrangement a resilient arm is formed from a metal rod or wire that has an L-shaped torsion spring section comprising a vertical torsion portion with a lower horizontal portion that prevents rotation of the vertical torsion portion, an arm extending away from the end of the vertical portion and a detent member comprising a post on the end of the arm. The L-shaped section is held with respect to the pivot connection member that connects to the other pivot connection member with the detent recess, and the post is positioned with respect to the arm so that the post will resiliently rotate with respect to the L-shaped section.

In another preferred arrangement, the resilient arm may comprise a U-shaped spring with two horizontal arms and a detent member comprising a vertical portion extending between the horizontal arms. The arms are held with respect to the pivot connection member that connects to the other pivot connection member with the detent recess so that the vertical portion moves into and out of the detent recess under the spring action of the arms.

In another preferred arrangement, the resilient arm is a plate-like member comprising a substantially planar region with a detent member comprising an edge of the plate-like member having a part-circular cross-section. The plate-like member is held with respect to the pivot connection member that connects to the other pivot connection member with the detent recess so that the protrusion moves into and out of the detent recess under the resilient bending action of the substantially planar region.

Preferably, the pivot connection member of the mirror assembly comprises a projection extending clear of the mirror assembly which engages within a socket in the mounting bracket. Both the projection and the socket may be provided with apertures that are aligned to enable a pivot pin to be inserted.

Preferably, the projection has a curved surface which abuts against the detent member. This curved surface is provided with at least one detent recess for location of the detent member. The mirror assembly may rotate in either direction depending on the direction of applied force. Alternatively, the mirror assembly may be designed to rotate only in one direction.

There may be provided more than one projection extending from the mirror assembly.

In order for the invention to be fully understood, preferred embodiments will now be described, but it should be realised that the invention is not to be restricted to the precise details of these embodiments.

Figure 2:
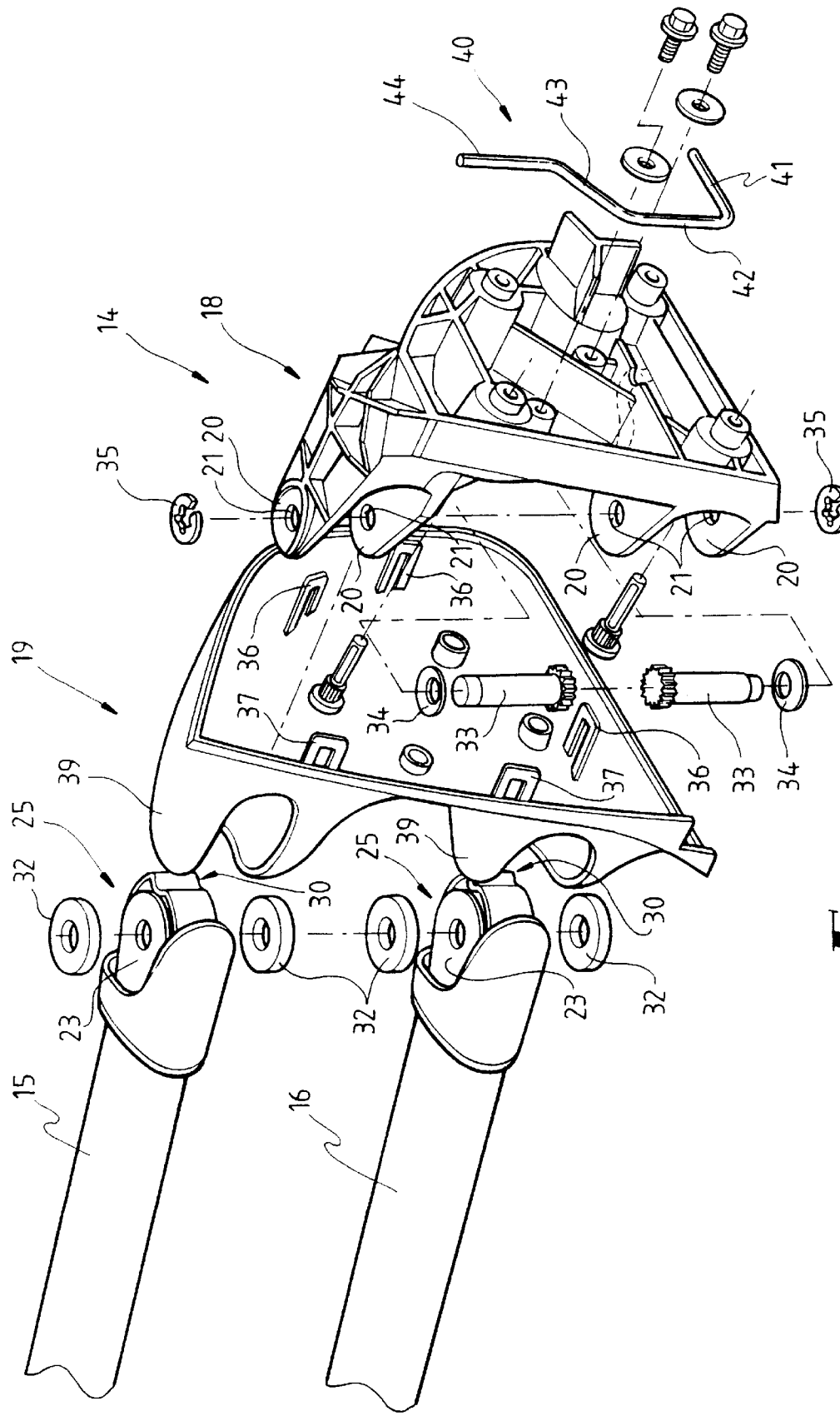
Figure 5:
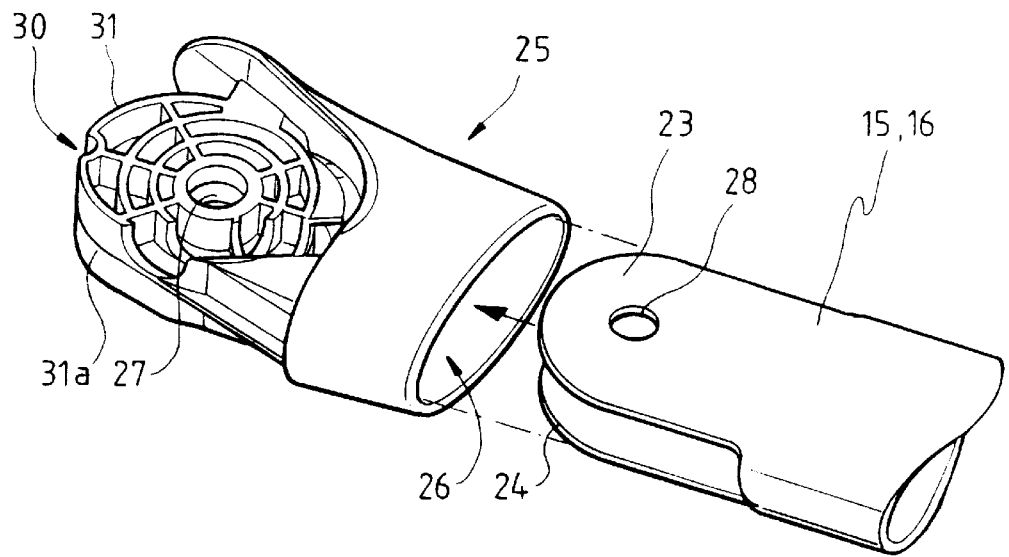
Figure 6:
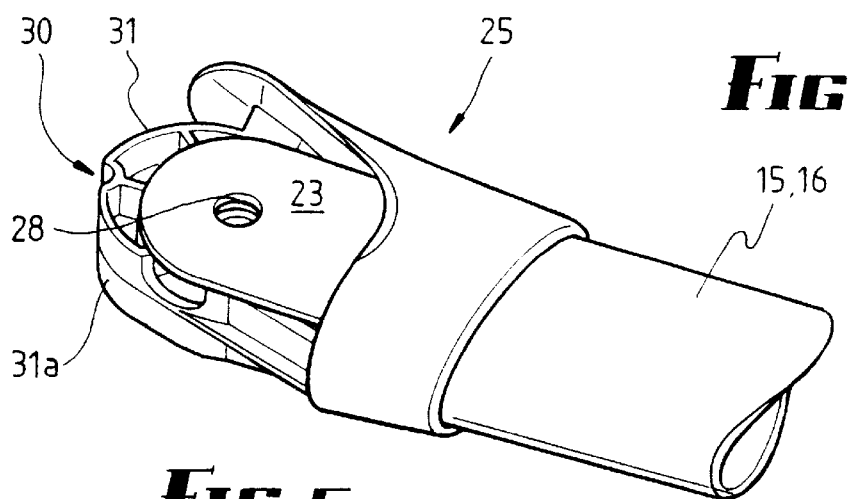
Figure 7:
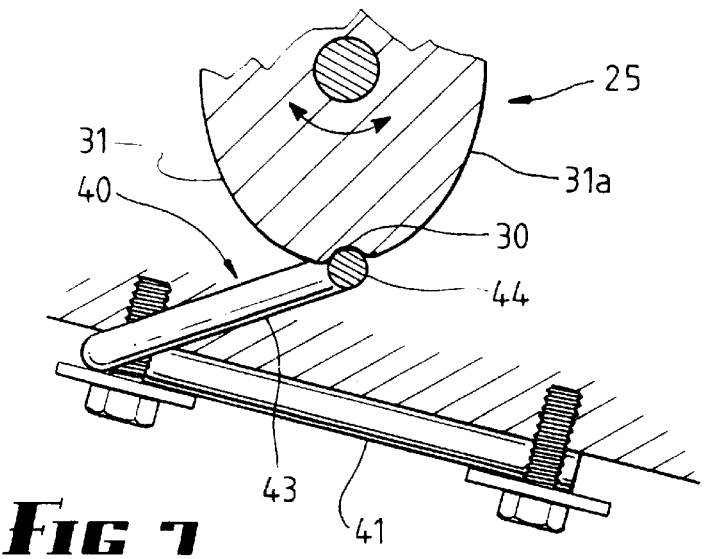
Figure 8:
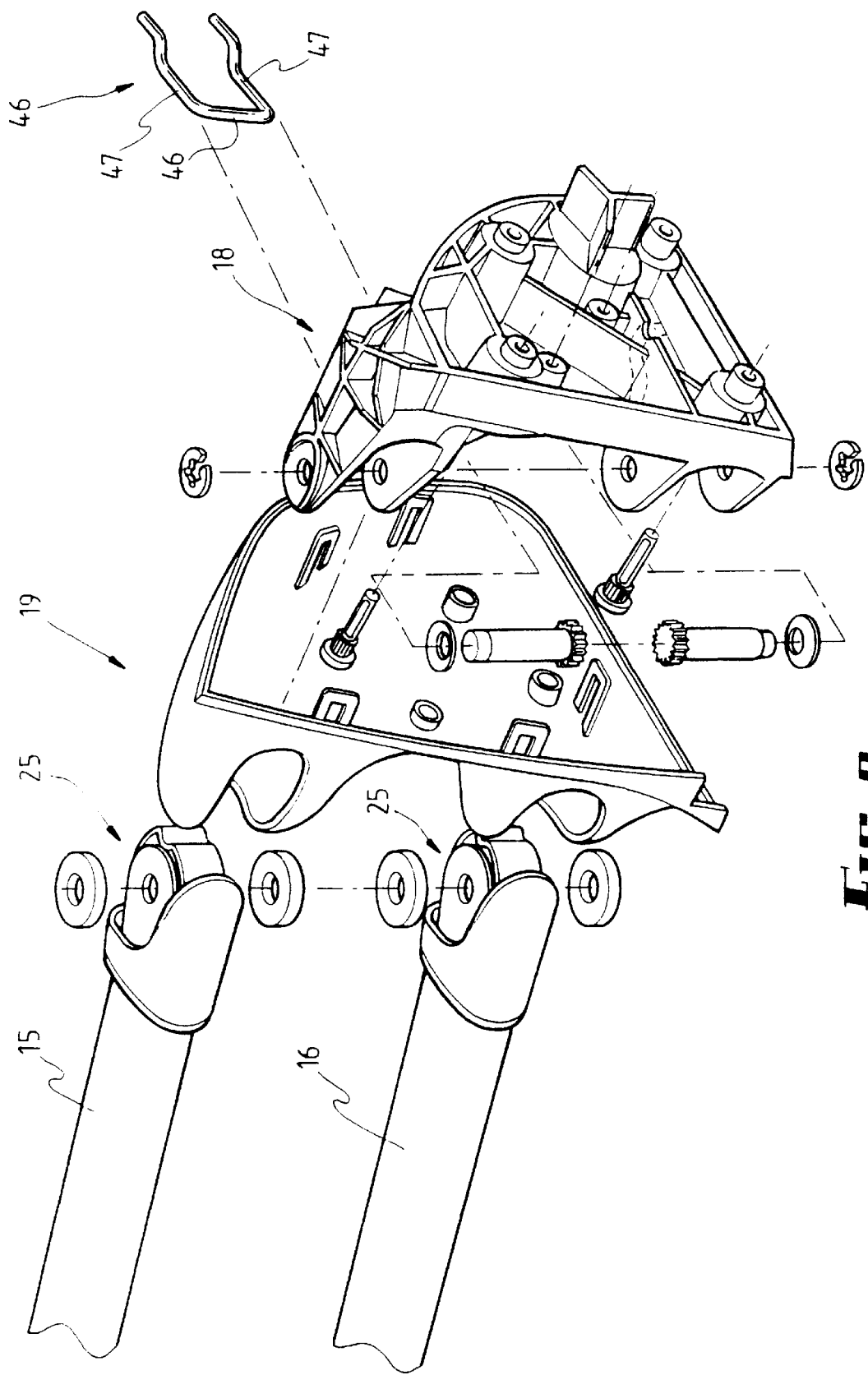
Figure 10:
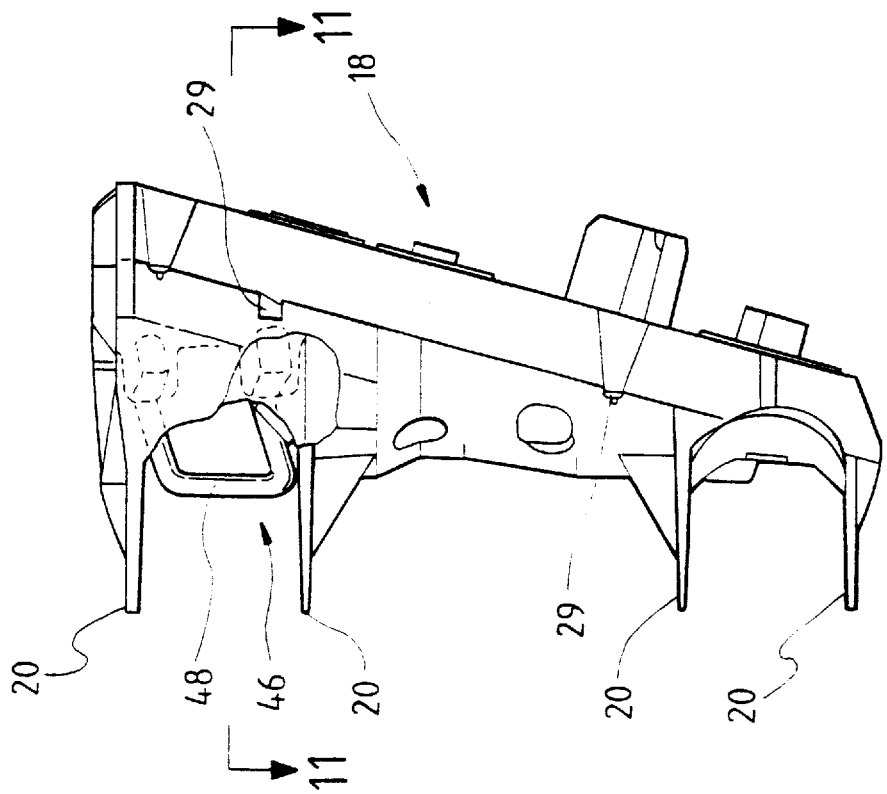
Figure 9:
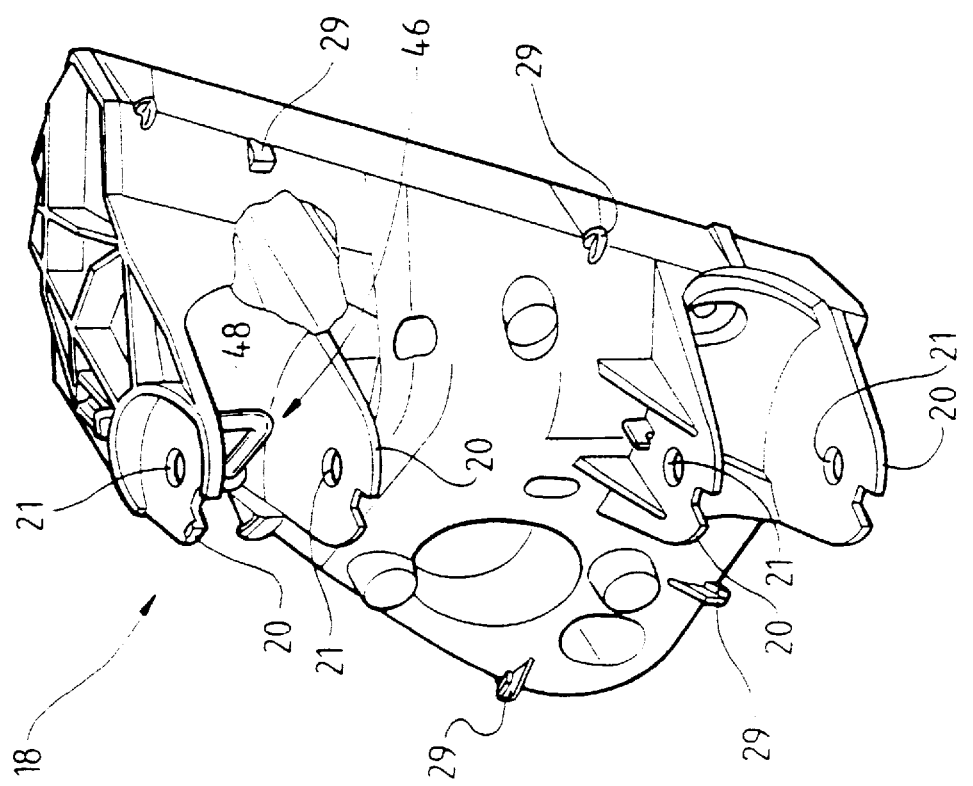
Figure 11:
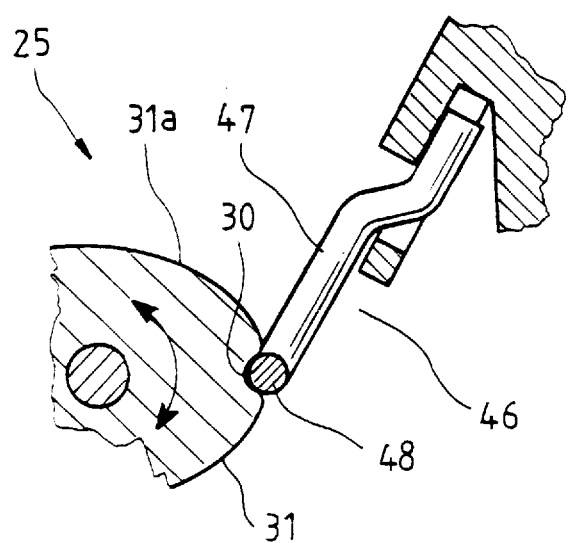
Figure 12:
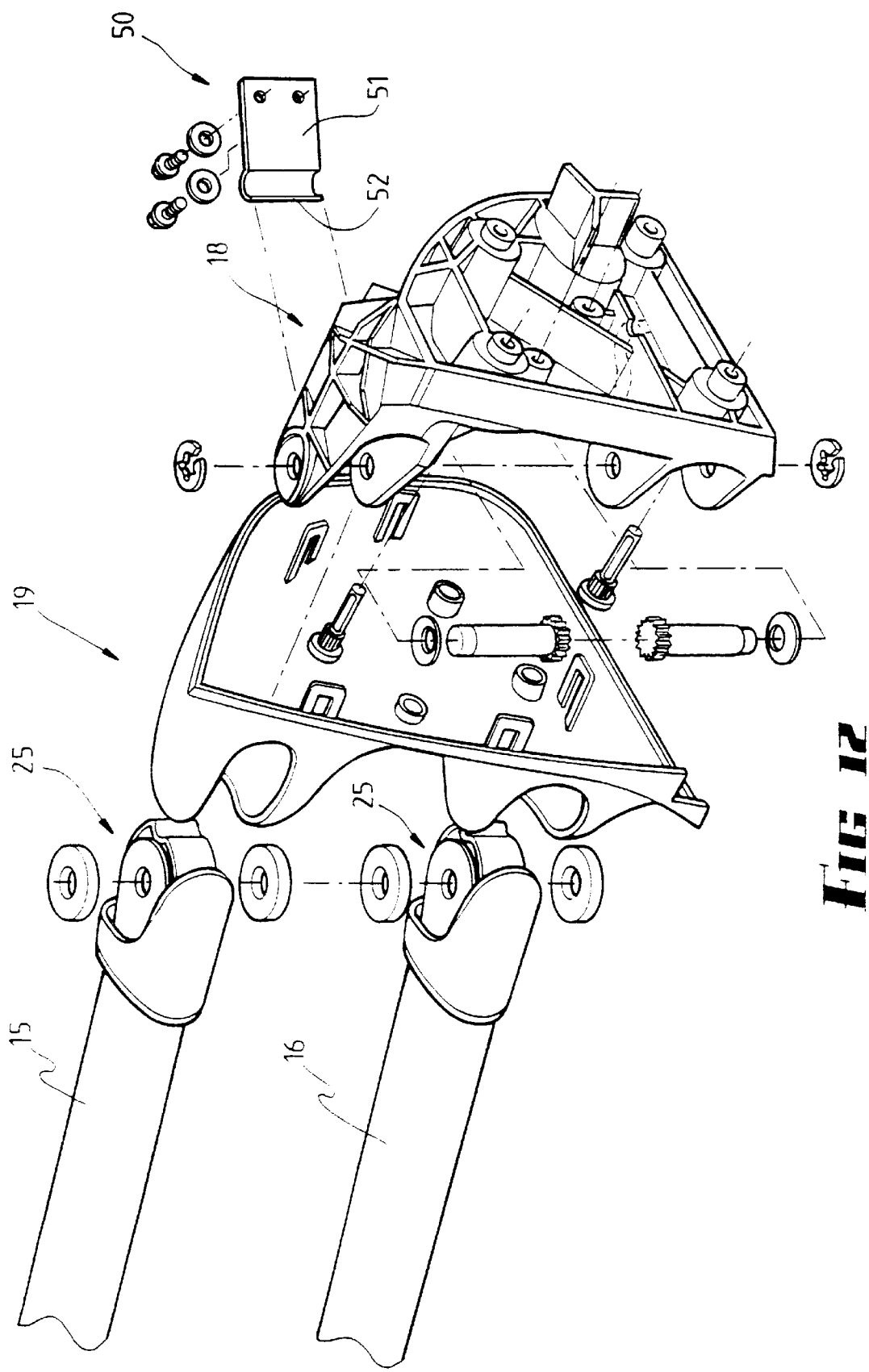
Figure 13:
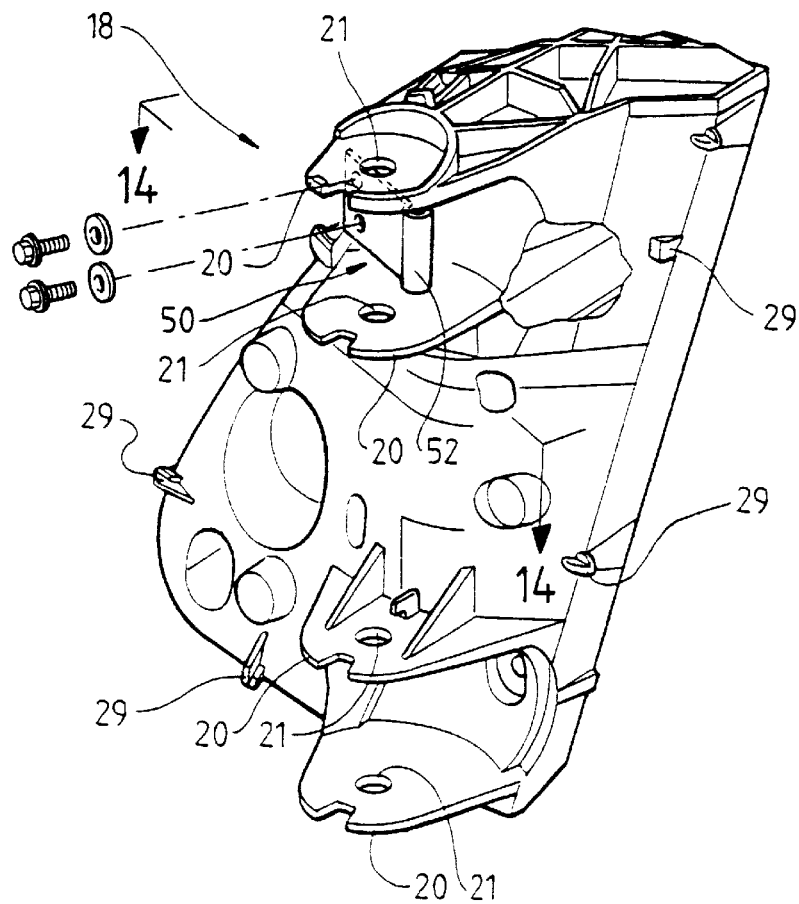
Figure 14:
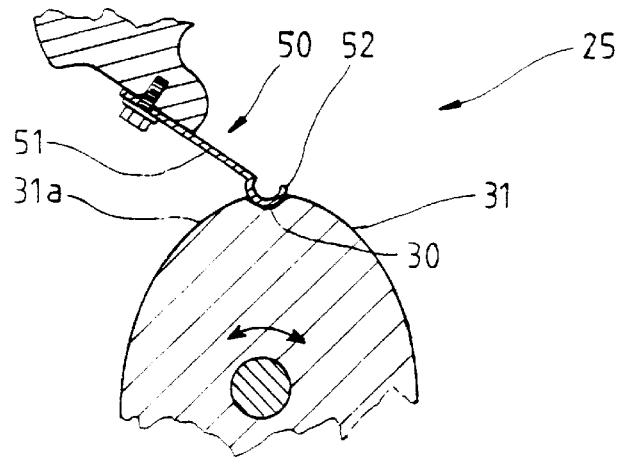

The embodiments are illustrated in the accompanying representations in which:

FIG. 1 shows a perspective view of a first embodiment of a mirror assembly, mounting bracket and connection arms incorporating pivot connections and detent mechanism, FIG. 2 shows a part exploded view of a mounting bracket, connection arms and a pair of first and second pivot connection members, FIG. 3 shows a front view of the mounting bracket shown in FIG. 2, FIG. 4 shows a rear view of the mounting bracket shown in FIG. 2, FIG. 5 shows a part perspective view of an arm prior to connection to an arm end, FIG. 6 shows a part perspective view of an arm attached to an arm end, FIG. 7 shows a schematic part sectional view of a torsion spring and arm end along the section line 7—7 shown in FIG. 4, FIG. 8 shows a part exploded view of a second embodiment of a mounting bracket, connection arms and a pair of first and second pivot connection members, FIG. 9 shows a front view of a mounting bracket shown in FIG. 8, FIG. 10 shows a side view of the mounting bracket shown in FIG. 8, FIG. 11 shows a schematic part cross-sectional view of a spring and arm end along the section line 11—11 shown in FIG. 10, FIG. 12 shows a part exploded view of a third embodiment of a mounting bracket, connection arms and a pair of first and second pivot connection members, FIG. 13 shows a front view of the mounting bracket shown in FIG. 12, and FIG. 14 shows a schematic part cross-sectional view of a spring and arm end along the section line 14—14 as shown in FIG. 13.

The general form of each of the embodiments is illustrated in FIG. 1.

In this general form, the vehicle mirror 10 comprises a mirror assembly 11, a mounting bracket 14 and upper and lower arms 15 and 16. The mirror assembly 11 comprises a mirror case 12 and mirrors 13.

The first embodiment of the invention is shown in more detail in FIGS. 2–7. The mounting bracket 14 comprises two parts, a base 18 and a cover 19. The base 18 has a pair of first pivot connection members which in this embodiment each comprise a pair of spigots 20 and aperture 21 which form a socket.

The second pivot connection member comprises a pair of projections which are the upper and lower arms 15 and 16. Each arm 15 and 16 is formed from a powder coated metal tube. As seen in FIG. 5 one end of each arm 15 and 16 has an upper and lower tab 23 and 24 that engage a respective arm connector 25. The upper and lower tabs 23 and 24 locate through an opening 26 in the arm connector 25 and locate either side of pivot aperture 27. Apertures 28 in both of the upper and lower tabs 23 and 24 align with the pivot aperture 27. The aperture 28 is a smaller diameter than the pivot aperture 27, and a press process is used to push the edges of aperture 28 into the pivot aperture 27 to thereby fix the arm 15 and 16 to the arm connector 25.

Preferably, the arm connector 25 is a die-cast member and is provided with a detent recess 30 and detent following surfaces 31 and 31a. The detent following surfaces 31 and 31a extend on either side of the detent recess 30.

The arm connector 25 and the attached upper and lower portions 23 and 24 form a projection which, together with friction washers 32 locate within the sockets formed between the spigots 20. Pivot pins 33 together with spring washers 34 are located through the pivot aperture 27 and apertures 21, and are held in place by circlips 35.

The cover 19 clips into place on the base 18. The base 18 is provided with projections 29 (FIGS. 3 and 4) which locate within apertures formed by U-shaped ridges 36 and connectors 37. The cover 19 has projections 39 with openings which allow insertion of the arm connectors 25 of the upper and lower arms 15,16. The arm ends have shaped surfaces that correspond with the curvature of the projections 39 that neatly fill the openings in the projections 39.

In the first embodiment, shown in FIGS. 2–7, the resilient arm comprises a torsion spring 40. In this embodiment (FIGS. 2–7), the torsion spring 40 comprises an L-shaped portion formed from a horizontal and vertical members 41 and 42, an arm 43 and a detent member comprising a post 44. As seen in FIGS. 3 and 4, the torsion spring 40 is mounted to the base 18 so that the post 44 is located within the upper socket formed between the two spigots 20. The post 44 locate through upper and lower slots (not drawn) in the spigots 20 respectively which constrain the post to movement in one direction. In this position, the post 44 is able to engage the detent recess 30 of the upper arm 15. The torsion spring 40 is designed to allow rotation of the arm 43 with respect to the vertical member 42. In addition, some rotation of the post does occur about the axis of the arm 43. Sufficient resistance is provided by the torsion spring 40 so that when the post 44 is engaged within the detent recess 30, the mirror assembly 11 is held rigidly in position. When sufficient force is applied to the mirror assembly 11, the post 44 is deflected away from the detent recess 30. The post 44 then abuts against the detent following surface 31.

In this embodiment, the mirror assembly 11 rotates only in one direction with the post 44 only engaging following surface 31. This provides the necessary breakaway motion should an impact force be applied to the rear of the mirror assembly 11. In addition, it allows the mirror assembly 11 to be rotated against the vehicle body. However, simple modifications to the projections 39 and their openings on the cover 19 would allow motion of the mirror assembly 11 in either direction.

As shown in FIG. 2, only the arm connector 25 of the upper arm 15 engages the torsion spring 40. This provides adequate holding force while at the same time allowing easy release for breakaway or parking purposes.

FIGS. 8–11 show an alternative embodiment in which the torsion spring 40 of FIGS. 2–7 is replaced by a spring 46 that comprises a generally U-shaped member having two horizontal arms 47 and a detent member comprising a vertical member 48. The mounting of the spring 46 to the base 18 is shown in FIGS. 9–11. The vertical member 48 engages the detent recess 30 in the same manner as described for the first embodiment shown in FIG. 2.

FIGS. 12–14 show a third embodiment in which the torsion spring 40 of FIGS. 2–7 is replaced by a spring 50 that comprises a plate-like member 51 with a detent member comprising pressed U-shaped portion 52. The mounting of the spring 50 to the base 18 is shown in FIGS. 13 and 14. The U-shaped portion 52 engages the detent recess 30 in the same manner as described for the two above described embodiments.

As will be seen from the above description, the invention provides a unique and convenient means for holding a mirror in a required position, while at the same time allowing for breakaway or stowage of the mirror in a folded position in close proximity to the side of the vehicle.

I claim:

1. A mirror for use on a motor vehicle comprising:

a mounting bracket for attachment to a motor vehicle having a primary pivot connection member;

a mirror assembly including a mirror, and a complementary pivot connection member for pivotal connection to said primary pivot connection member to allow angular movement of said mirror assembly in respect of said mounting bracket, at least one detent recess provided on a first one of said primary and complementary pivot connection members;

a resilient arm attached at a first end thereof to the other of said primary and complementary pivot connection members; and a detent member located at a second end of said resilient arm and being positioned so that the detent member engages said detent recess to hold said mirror assembly with respect to said mounting bracket, said resilient arm being resiliently moveable to allow angular movement of said second end about said first end so that said detent member disengages said detent recess upon sufficient force being applied to said mirror assembly to, in turn, allow said mirror assembly to be rotated to a different position.

2. A mirror according to claim 1 wherein said resilient arm is resiliently moveable, in a plane perpendicular to an axis about which said primary and complementary pivot connection members rotate, to allow said detent member to disengage said detent recess.

3. A mirror according to claim 2 in which said resilient arm comprises a U-shaped spring with two horizontal arms and a vertical portion extending between said horizontal arms forming said detent member.

4. A mirror according to claim 3 in which said resilient arm is formed from a metal rod or wire and in which said arms are held with respect to said mounting bracket so that said vertical portion moves into and out of said detent recess under resilient bending of said arms.

5. A mirror according to claim 2 comprising:

two pivot connection members extending from said mirror assembly wherein at least one of said mirror assembly pivot connection members comprises an arm with a distal end forming a curved surface interrupted by a recess extending in a direction parallel to said pivot connection axis thereby forming said detent recess and;

two pivot connection members extending from said mounting bracket wherein each of said mounting bracket pivot connections comprises a socket formed between a pair of projections extending from said mounting bracket.

6. A mirror according to claim 5 in which said resilient arm comprises an a attached to a torsion spring.

7. A mirror according to claim 6 in which said resilient arm is formed from a metal rod or wire that has an L-shaped torsion spring section comprising a vertical torsion portion with a lower end that is restrained from rotation by a horizontal section, an arm extending away from an upper end of said vertical portion and a post on the end of said arm forming said detent member.

8. A mirror according to claim 7 in which said L-shaped section is held with respect to said mounting bracket, and said post is positioned so that said post will resiliently rotate with respect to said vertical torsion portion thereby allowing its disengagement from said detent recess.

9. A mirror according to claim 5 in which said resilient arm comprises a U-shaped spring with two horizontal arms and a vertical portion extending between said horizontal arms forming said detent member.

10. A mirror according to claim 9 in which said resilient arm is formed from a metal rod or wire and in which said arms are held with respect to said mounting bracket so that said vertical portion moves into and out of said detent recess under resilient bending of said arms.

11. A mirror according to claim 5 in which said resilient arm is a plate-like member comprising a substantially planar region with a detent member comprising an edge of said plate-like member having a part-circular cross-section.

12. A mirror according to claim 11 in which said plate-like member is held with respect to said pivot connection member that connects to said mounting bracket so that said detent member moves into and out of said detent recess under resilient action of said substantially planar region.

13. A mirror for use on a motor vehicle comprising:

a mounting bracket for attachment to a motor vehicle having a primary pivot connection member;

a mirror assembly including a mirror and a complementary pivot connection member for pivotal connection to said primary pivot connection member to allow angular movement of said mirror assembly with respect to said mounting bracket;

at least one detent recess provided on a first one of said primary and complementary pivot connection members;

a resilient arm comprising an arm attached, at a first end, to a torsion spring which is attached to the other of said primary and complementary pivot connection members; and a detent member located at a second end of said resilient arm and being positioned so that the detent member engages said detent recess to hold said mirror assembly with respect to said mounting bracket, said resilient arm being resiliently moveable in a plane perpendicular to the axis about which said pivot connection members rotate to allow said detent member to disengage said detent recess upon sufficient force being applied to said mirror assembly to, in turn, allow said mirror assembly to be rotated to a different position.

14. A mirror according to claim 13 in which said resilient arm is formed from a metal rod or wire that has an L-shaped torsion spring section comprising a vertical torsion portion with a lower end that is restrained from rotation by a horizontal section, an arm extending away from an upper end of said vertical portion and a post on the end of said arm forming said detent member.

15. A mirror according to claim 14 in which said L-shaped section is held with respect to said mounting bracket, and said post is positioned so that said post will resiliently rotate with respect to said vertical torsion portion thereby allowing its disengagement from said detent recess.

16. A mirror for use on a motor vehicle comprising:

a mounting bracket for attachment to a motor vehicle having a primary pivot connection member;

a mirror assembly including a mirror and a complementary pivot connection member for pivotal connection to said primary pivot connection member to allow angular movement of said mirror assembly with respect to said mounting bracket;

at least one detent recess provided on a first one of said primary and complementary pivot connection members;

a resilient arm, in the form of a plate-like member comprising a substantially planar region being held at a first end with respect to other of said primary and complementary pivot connection members, and a detent member comprising an edge of said plate-like member, being located at the second end thereof and having a part-circular cross-section, positioned so that the detent member engages said detent recess to hold said mirror assembly with respect to said mounting bracket, said resilient arm being resiliently moveable in a plane perpendicular to the axis about which said pivot connection members rotate to allow said detent member to disengage said detent recess upon sufficient force being applied to said mirror assembly to, in turn, allow said mirror assembly to be rotated to a different position.

17. A mirror according to claim 16 in which said plate-like member is held with respect to said pivot connection member that connects to said mounting bracket so that said detent member moves into and out of said detent recess under resilient action of said substantially planar region.

* * * * *